United States Patent
Räikkönen

(10) Patent No.: US 10,801,888 B2
(45) Date of Patent: Oct. 13, 2020

(54) LIGHT COLLECTION ARRANGEMENT FOR OPTICAL EMISSION SPECTROSCOPY

(71) Applicant: Hitachi High-Tech Analytical Science Finland Oy, Espoo (FI)

(72) Inventor: Esa Räikkönen, Espoo (FI)

(73) Assignee: Hitachi High-Tech Analytical Science Finland Oy, Espoo (FI)

( * ) Notice: Subject to any disclaimer, the term of this patent is extended or adjusted under 35 U.S.C. 154(b) by 0 days.

(21) Appl. No.: 16/681,323

(22) Filed: Nov. 12, 2019

(65) Prior Publication Data

US 2020/0149962 A1 May 14, 2020

(30) Foreign Application Priority Data

Nov. 12, 2018 (EP) .................................... 18205637

(51) Int. Cl.
*G01J 3/30* (2006.01)
*G01J 3/02* (2006.01)
(Continued)

(52) U.S. Cl.
CPC ............. *G01J 3/0216* (2013.01); *G01J 3/021* (2013.01); *G01J 3/0218* (2013.01); *G01J 3/443* (2013.01); *G01N 21/63* (2013.01)

(58) Field of Classification Search
CPC ........ G01J 3/4406; G01J 3/02; G01N 21/718; G01N 21/645; G01N 21/6458
(Continued)

(56) References Cited

U.S. PATENT DOCUMENTS

| 4,497,540 | A | * | 2/1985 | Breckinridge | ..... G02B 17/0615 250/330 |
| 7,667,838 | B2 | | 2/2010 | Ackerman et al. | |

(Continued)

FOREIGN PATENT DOCUMENTS

| EP | 3343205 A1 | 7/2018 |
| WO | 2018/082136 A1 | 5/2018 |

OTHER PUBLICATIONS

European Search Report. Issued by the European Patent Office in Application No. EP 18205637 dated Jan. 16, 2019. 2 pages.

*Primary Examiner* — Md M Rahman
(74) *Attorney, Agent, or Firm* — Meunier Carlin & Curfman LLC

(57) ABSTRACT

In accordance with an example embodiment of the invention, a detector assembly for an analyzer device for analysis of elemental composition of a sample using optical emission spectroscopy is provided. The detector assembly comprises an exciter for generating an excitation focused at a target position to invoke an optical emission from a surface of the sample at the target position; and a light collection arrangement for transferring the optical emission to a spectrometer. The light collection arrangement comprises a concave spherical mirror, an optical receiver arranged in an image point in the principal axis of the concave spherical mirror and a folding mirror including at least one aperture. The exciter is arranged with respect to the light collection arrangement such that the excitation is transferred towards the target position through said at least one aperture, and the folding mirror is arranged between the concave spherical mirror and the optical receiver such that the folding mirror folds the principal axis of the concave spherical mirror towards the target position and such that said at least one aperture is aligned with the principal axis of the concave (Continued)

spherical mirror to allow transferring optical emission reflected from the concave spherical mirror therethrough towards the optical receiver.

15 Claims, 4 Drawing Sheets

(51) Int. Cl.
  *G01J 3/443* (2006.01)
  *G01N 21/63* (2006.01)
(58) Field of Classification Search
  USPC .......................................... 356/318
  See application file for complete search history.

(56) References Cited

U.S. PATENT DOCUMENTS

| | | |
|---|---|---|
| 2013/0271761 A1 | 10/2013 | Rutberg et al. |
| 2015/0124336 A1* | 5/2015 | Kaufman ................ G01J 5/505 |
| | | 359/728 |
| 2019/0271652 A1 | 9/2019 | Zhao et al. |

* cited by examiner

300

Generate an excitation focused at a target position to invoke an optical emission from a surface of a sample arranged at the target position, wherein the excitation is transferred towards the target position through at least one aperture in a folding mirror

302

Transfer the optical emission from the target position via the folding mirror, via a concave spherical mirror and through the at least one aperture in the folding mirror to an optical receiver arranged at an image point in the center axis of the concave spherical mirror, wherein the folding mirror folds the center axis of the concave spherical mirror towards the target position

304

Transfer the optical emission from a first end of an optical fiber arranged at the image point of the concave spherical mirror to a spectrometer arranged at a second end of the optical fiber

LIGHT COLLECTION ARRANGEMENT FOR OPTICAL EMISSION SPECTROSCOPY

CROSS REFERENCE TO RELATED APPLICATIONS

This application claims the benefit of European Application No. 18205637.4, filed Nov. 12, 2018, the disclosure of which is incorporated herein by reference in its entirety.

TECHNICAL FIELD

The present invention relates to analysis of elemental composition of a sample using optical emission spectroscopy and, in particular, to a light collection arrangement for optical emission spectroscopy that is suitable for use in an analyzer device capable of carrying out such an analysis.

BACKGROUND

Handheld or otherwise portable analyzer devices are frequently used in the field e.g. for recognizing and sorting objects according to material(s) they contain. While several techniques for analyzing a sample are available, optical emission spectroscopy is widely employed in portable analyzer devices to determine elemental composition of the sample under study. Such analyzer devices may be referred to as optical analyzers. An optical analyzer typically includes an excitation means for invoking an optical emission from a surface of a sample under study, a light collection arrangement for transferring the optical emission to a spectrometer for dispersing the optical emission into different wavelengths, a detector means for capturing signals that are descriptive of the dispersed optical emission and an analysis means for determination of the elemental composition of the sample under study on the basis of the captured signals.

A well-known example of such an optical analyzer employs laser-induced breakdown spectroscopy (LIBS) and it may be referred to as a LIBS analyzer. A LIBS analyzer comprises, as the excitation means, a laser source that is arranged to generate a high peak power laser pulse. The laser pulse is focused to the sample under study to form a plasma plume on a surface of the sample. During plasma formation free electrons start to recombine with ions, and this event invokes optical emission at wavelength(s) that are characteristic to elements on the surface of the sample. The light emission is transferred via the optical arrangement to the spectrometer, from which the dispersed optical emission is guided to the detector means, which captures detector signals that are descriptive of the dispersed optical emission and that serve as basis for analysis of elemental composition of the sample by the analysis means. The analysis is based on intensity distribution of dispersed optical emission across a range of wavelengths.

In a typical design of an optical analyzer such as a LIBS analyzer the optical arrangement comprises an arrangement of optical components (e.g. one or more lenses and/or one or more mirrors) that serve to collect and focus the optical emission to a first end of an optical fiber, which transfers the optical emission to the spectrometer. Such an arrangement of analyzer components contributes towards providing an optical analyzer device that is small in size, which is in many scenarios an important characteristic of a device that is designed for handheld operation in field conditions. Nevertheless, further reduction in size would be still advantageous in order to make such analyzer devices even more convenient and agile for the user.

SUMMARY

It is therefore an object of the present invention to provide an optical arrangement for an optical analyzer device that enables further reducing the size of the analyzer without compromising the detection performance.

In the following a simplified summary of some embodiments of the present invention is provided in order to facilitate a basic understanding of the invention. The summary is not, however, an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with an example embodiment of the invention, a detector assembly for an analyzer device for analysis of elemental composition of a sample using optical emission spectroscopy is provided, the detector assembly comprising an exciter for generating an excitation focused at a target position to invoke an optical emission from a surface of the sample at the target position; and a light collection arrangement for transferring the optical emission to a spectrometer, the light collection arrangement comprising a concave spherical mirror, an optical receiver arranged in an image point in the principal axis of the concave spherical mirror and a folding mirror including at least one aperture, wherein the exciter is arranged with respect to the light collection arrangement such that the excitation is transferred towards the target position through said at least one aperture, and wherein the folding mirror is arranged between the concave spherical mirror and the optical receiver such that the folding mirror folds the principal axis of the concave spherical mirror towards the target position and such that said at least one aperture is aligned with the principal axis of the concave spherical mirror to allow transferring optical emission reflected from the concave spherical mirror therethrough towards the optical receiver.

In accordance with another example embodiment of the invention, an analyzer device for analysis of elemental composition of a sample is provided, the analyzer device comprising a detector assembly according to the example embodiment described in the foregoing; and a casing for enclosing components of the detector assembly, wherein the detector assembly is arranged in a front end of the casing such that when the front end of the analyzer device is placed close to or against a surface of the sample, the target position is at or approximately at the surface of the sample.

In accordance with another example embodiment of the invention, a method for facilitating analysis of elemental composition of a sample using optical emission spectroscopy by using a light collection arrangement comprising a folding mirror including at least one aperture and a concave spherical mirror is provided, the method comprising: generating an excitation focused at a target position to invoke an optical emission from a surface of the sample at the target position, wherein the excitation is transferred towards the target position through said at least one aperture in the folding mirror; and transferring the optical emission from the target position via the folding mirror, via the concave spherical mirror and through said at least one aperture in the folding mirror to an optical receiver arranged at an image point in the principal axis of the concave spherical mirror, wherein the folding mirror folds the principal axis of the concave spherical mirror towards the target position The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF DRAWINGS

The embodiments of the invention are illustrated by way of example, and not by way of limitation, in the figures of the accompanying drawings, where.

FIG. 5 depicts a flowchart that illustrates a method according an example; and

DETAILED DESCRIPTION

Figure 1:
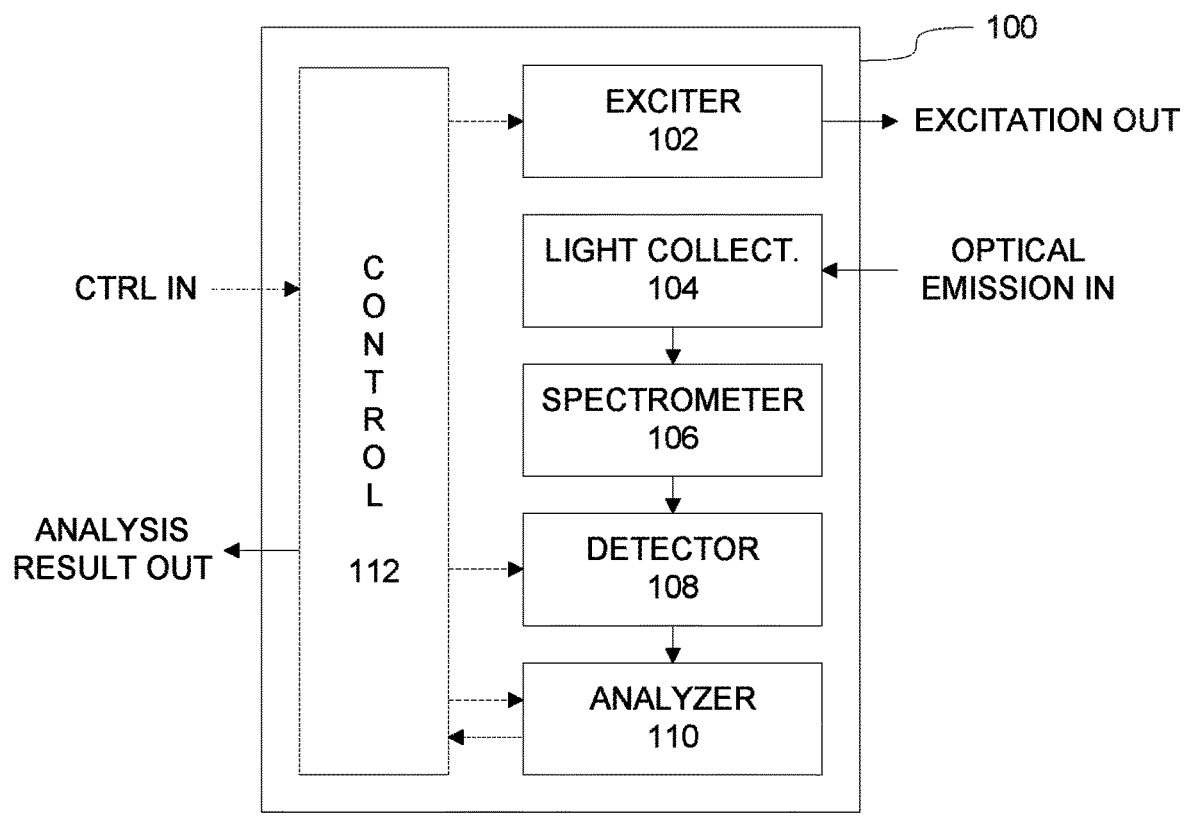
FIG. 1 illustrates a block diagram of some logical elements of an analyzer device according to an example.

FIG. 1 illustrates a block diagram of some logical elements of an analyzer device 100 that is useable for analysis of elemental composition of a sample using optical emission spectroscopy. In this non-limiting example, the analyzer device 100 comprises an exciter 102 for generating an excitation in order to invoke an optical emission from a surface of a sample under study, a light collection arrangement 104 for transferring the optical emission to a spectrometer 106, the spectrometer 106 for dispersing the optical emission into a set of wavelengths, a detector 108 for capturing, on basis of the dispersed optical emission, detection signals that are descriptive of the dispersed optical emission and an analyzer 110 for determining the elemental composition of the sample under study based on the detection signals. The analyzer device further comprises a control entity 112 for operating at least the exciter 102, the detector means 108 and the analyzer 110 to carry out a spectral analysis for determination of the elemental composition of the sample under study. The control entity 112 is communicatively coupled (e.g. by one or more electrical wires or electrical connectors of other type) at least to the exciter 102, to the detector 108 and to the analyzer 110 to enable the control entity 112 to control at least some aspects of operation of these components. In the example of FIG. 1, the dashed lines denote control signals and solid lines denote flow of (other) information. In other examples, the detector 108 may be, at least in part, integrated to the spectrometer 106.

Each of the exciter 102, the spectrometer 106, the detector 108, the analyzer 110 and the control entity 112 may be provided using techniques known in the art hence they are not described herein in detail. However, for completeness of the description, in the following a few examples of providing the exciter 102 and the detector 108 are described.

The exciter 102 may be arranged to operate under control of an activation signal issued by the control entity 112. The exciter 102 may also be referred to as excitation means and it may comprise, for example, a laser source that is arranged to generate excitation that comprises a single laser pulse or a series of two or more laser pulses. In case the exciter 102 comprises the laser source for this purpose, the analyzer device 100 may be referred to as a laser-induced breakdown spectroscopy (LIBS) analyzer. The activation signal that initiates generation of the laser pulse(s) from the exciter 102 may specify characteristics of the laser pulse(s), e.g. one or more of the following: the number of pulses to be generated, repetition rate/frequency of the pulses to be generated (if more than one pulses are to be generated), energy of the pulse(s), bandwidth of the pulse(s). The exciter 102 may be arranged to control provision of the laser pulses therefrom according to the characteristics specified in the activation signal.

Instead of the activation signal indicating all or any characteristics of the series of one or more laser pulses to be generated, some or all of the laser pulse generation characteristics applied by the laser source may be predefined. As an example, the activation signal may cause the laser source to generate a series including a predefined number of laser pulses at a predefined energy using a predefined bandwidth and predefined one or more wavelengths, where the laser pulses have predefined duration at a predefined repetition rate.

The detector 108 may also be referred to as detector means and it may comprise, for example, an image sensor provided as a charge-coupled device (CCD), as a complementary metal-oxide-semiconductor (CMOS) sensor or, in general, as any (silicon-based) solid state sensor.

The control entity 112 is arranged to operate the exciter 102, the detector 108 and the analyzer 110 to carry out the spectral analysis in response to an initiation signal. The initiation signal may be received, for example, in response to the user operating a user interface of the analyzer device 100 accordingly. The spectral analysis may involve the control entity 112 operating the exciter 102 to generate the excitation, operating the detector 108 to record one or more detection signals, and operating the analyzer 110 to analyzer the one or more detection signals to determine the elemental composition of the sample under study.

Figure 2A:
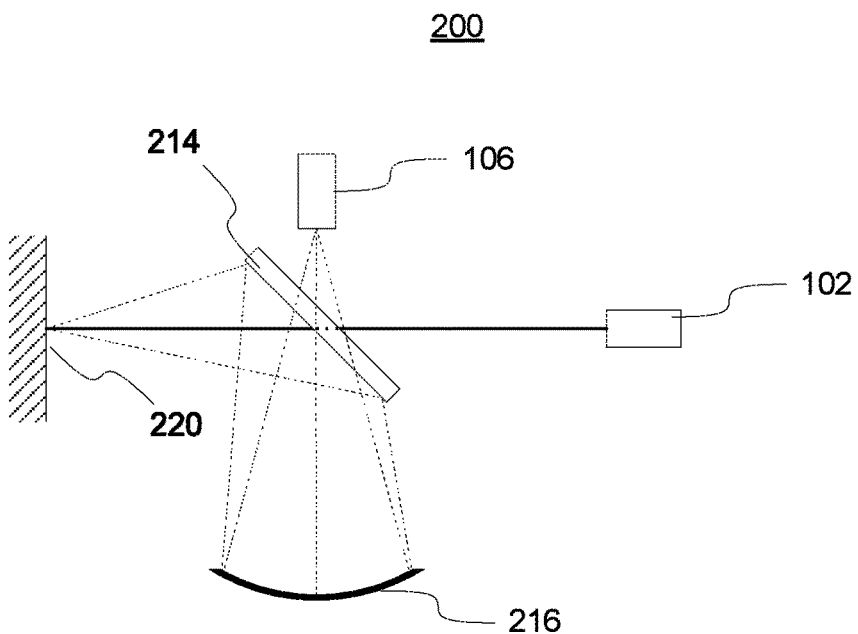
FIG. 2A schematically depicts some components of a detector assembly according to an example.

FIG. 2A schematically depicts some components of a detector assembly 200 according to an example, where the detector assembly 200 includes the light collection arrangement 104 together with the exciter 102. The exciter 102 is arranged to generate an excitation focused at a target position for invoking an optical emission from a surface of the sample 220 at the target position. The light collection arrangement 104 is arranged to transfer the optical emission from the target position to the spectrometer 106. In the example of FIG. 2A, the light collection arrangement 104 comprises a folding mirror 214 and a concave spherical mirror 216 arranged with respect to each other such that the folding mirror 214 is arranged between the concave spherical mirror 216 and its image point such that the folding mirror 214, at least conceptually, folds the principal axis of the concave spherical mirror 216 towards the target position, the folding mirror 214 thereby serving to reflect the optical emission from the target position towards the concave spherical mirror 216 symmetrically with respect to the principal axis of the concave spherical mirror 216. The folding mirror 214 includes at least one aperture that is aligned with the principal axis of the concave spherical mirror 216 to allow transferring the optical emission reflected from the concave spherical mirror 216 through the folding mirror 214 to an optical receiver arranged at the image point of the concave spherical mirror 216, which in the example of FIG. 2A comprises the spectrometer 106.

While the folding the folding mirror 214 serves to conceptually fold the principal axis of the concave spherical mirror 216 towards the target point, due to the above-described aperture in the folding mirror 214 a portion of the optical emission arriving at the folding mirror 214 from direction of the target position along the optical axis (and its immediate vicinity) is not reflected towards the concave spherical mirror 216. Nevertheless, the folding mirror 214 serves to fold the principal axis of the concave spherical mirror 216 towards the target point in the sense that it folds the center axis of the optical emission arriving at the folding mirror 214 from direction of the target position towards the concave spherical mirror 216 such that the center axis of the optical emission reflected from the folding mirror 214 is coaxial or substantially coaxial with the principal axis of the concave spherical mirror 216.

The principal axis of the concave spherical mirror 216 refers to the symmetry axis of the concave spherical mirror 216, which may also be referred to as a center axis or as an optical axis of the concave spherical mirror 216. The image point of the concave spherical mirror 216 refers to a position within the light collection arrangement 104 at which the image of the optical emission at the target position intended for the spectrometer 106 is formed in a desired size. The imaging point is a point in the principal axis of the concave spherical mirror 216 at a distance that results in the image of the desired size. In an example, the imaging point may be the focal point of the concave spherical mirror 216, i.e. a point onto which collimated light parallel to the principal axis of the concave spherical mirror 216 is focused. The image point may be considered to be located at an image distance from the concave spherical mirror 216.

Figure 2B:
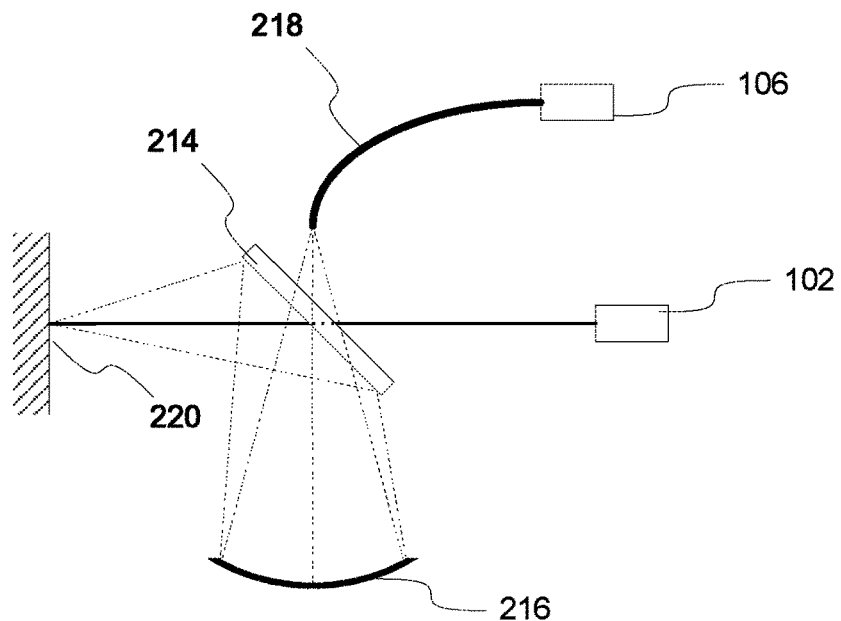
FIG. 2B schematically depicts some components of a detector assembly according to an example.

FIG. 2B schematically depicts some components of a variation of the detector assembly 200 according to an example. In this exemplifying variation the detector assembly 200 further comprises an optical fiber 218 that has a first end arranged in the image point of the concave spherical mirror 216 for transferring the light to the spectrometer 106 arranged at a second end of the optical fiber 218. The second end of the optical fiber 218 is arranged such that it guides the optical emission transferred therethrough to the spectrometer 106 to enable dispersion of the light received via the optical fiber 218 to the detector 108. In the example of FIG. 2B the optical receiver arranged at the image point of the concave spherical mirror 216 (i.e. at the image distance from the concave spherical mirror 216) hence comprises the first end of the optical fiber 218.

In further variations of the detector assembly 200, the optical emission may be transferred from the image point of the concave spherical mirror 216 to the spectrometer 106 using an optical transfer arrangement other than the optical fiber 218, e.g. an arrangement of one or more optical components (such as one or more mirrors and/or one or more lenses) that define an optical path from the image point of the concave spherical mirror 216 to the spectrometer 106. In such examples, the optical receiver arranged at the image point of the concave spherical mirror 216 hence comprises an optical component that serves as an entry point to the optical transfer arrangement for transferring the optical emission from the image point of the concave spherical mirror 216 to the spectrometer 106.

In the detector assembly 200, the excitation from the exciter 102 is transferred through said at least one aperture in the folding mirror 214 towards the target position at a surface of a sample 220, where the excitation invokes optical emission at wavelength(s) that are characteristic to elements on the surface of the sample 220. In case the exciter 102 comprises a laser source for generating laser pulses as the excitation, the optical emission is invoked due to plasma formation at the surface of the sample 220. The target position resides in the main axis of the propagation path of the excitation in a first predefined distance from the exciter 102 and in a second predefined distance from the concave spherical mirror 216. The exciter 102 is preferably positioned with respect to the folding mirror 214 such that the main axis of the propagation path of the excitation is coaxial with the center axis of the collected optical emission arriving at the folding mirror 214 from direction of the target position. This contributes towards arranging the detector assembly 200 in a relatively small space, which may be beneficial for design of an analyzer device that makes use of the detector assembly 200.

In an example, the light collection arrangement 104 may further include focusing optics that are arranged to focus the excitation from the exciter 102, e.g. laser pulses originating from the laser source, to the target position. In another example, the focusing optics may be provided as part of the exciter 102 that is positioned with respect to the light collection arrangement 104 such that the excitation originating therefrom is transferred through the folding mirror 214 and focused at the target position.

The folding mirror 214 is arranged in an oblique angle with respect to the principal axis of the concave spherical mirror 216 and, consequently, with respect to the main axis of the propagation path of the excitation. The reflecting surface of the folding mirror 214 is arranged to face the target position and the concave spherical mirror 216 such that the folding mirror 214 serves to fold the principal axis of the concave spherical mirror 216 towards the target position. The term 'facing' should construed herein broadly, encompassing also a scenario where a surface is facing another element in an oblique angle. Preferably, the arrangement of the folding mirror 214 and the concave spherical mirror 216 folds the principal axis of the concave spherical mirror 216 such that the folded portion of the principal axis (between the folding mirror 214 and the target position) is coaxial with the main axis of the propagation path of the excitation. Consequently, the folding mirror 214 reflects the optical emission from direction of the target position towards the concave spherical mirror 216.

The reflecting surface of the folding mirror 214 is preferably planar (i.e. 'flat') or substantially planar. The side of the folding mirror 214 provided with the reflecting surface may be referred to as a front side of the folding mirror 214, whereas the opposite side (i.e. the side facing the exciter 102 and the optical receiver in an oblique angle) may be referred to as a back side of the folding mirror 214. In the example depicted in illustrations of FIGS. 2A and 2B, the principal axis of the concave spherical mirror 216 meets the reflecting surface of the folding mirror 214 in or approximately in 45 degree angle, which results in folding the principal axis of the concave spherical mirror 216 by approximately 90 degrees. In other words, the arrangement of the concave spherical mirror 216 and the folding mirror 214 according to the example of FIGS. 2A and 2B results in approximately 90 degree angle between the principal axis of the concave spherical mirror 216 and the center axis of the optical emission between the target position and the folding mirror 214.

The concave reflecting surface of the concave spherical mirror 216 serves to converge the light reflected from the folding mirror 214 towards the image point. Along the lines described in the foregoing, the concave spherical mirror 216 is preferably arranged with respect to the folding mirror 214 and the target position such that optical emission from the target position and reflected from the folding mirror 214 meets the reflecting surface of the concave spherical mirror 216 symmetrically with respect to the principal axis of the concave spherical mirror 216. The curvature of the concave spherical mirror 216 is selected such that the concave spherical mirror 216 and its image point reside on the opposite sides of the folding mirror 214 to ensure that the optical receiver arranged at the image point does not interfere with the excitation and/or the optical emission between the target position and the folding mirror 214.

Components of the detector assembly 200 may be arranged in a front end of a casing of the analyzer device 100 such that when the front end of the analyzer device 100 is placed close to or against the surface of the sample 220, the target position is at or approximately at the surface of the sample 220. Consequently, optical emission invoked at the target position (or in its vicinity) due to the excitation from the exciter 102 is transferred via the folding mirror 214, via the concave spherical mirror 216 and through the at least one aperture in the folding mirror 214 to the optical receiver at the image point of the concave spherical mirror 216 and hence (further) to the spectrometer 106. The target position typically resides outside the analyzer device 100, while at least conceptually it may be considered as part of the light collection arrangement 104.

The at least one aperture in the folding mirror 214 referred to in the foregoing provides a mechanism that enables both the excitation from the exciter 102 and the optical emission reflected from the concave spherical mirror 216 towards the optical receiver to pass through the folding mirror 214. The at least one aperture implies that there is at least one opening in the reflecting surface on the front side of the folding mirror 214 and at least one opening in the back surface of the folding mirror 214. In this regard, the at least one opening in the reflecting surface on the front side of the folding mirror 214 is preferably in the center or approximately in the center of the folding mirror 214. According to an example, the at least one opening comprises a single opening that is aligned with the main axis of the propagation path of the excitation from the exciter 102 and aligned with the principal axis of the concave spherical mirror 216.

The optical emission from the target position is emitted in a wide solid angle from the surface of the sample 220, thereby substantially forming a light cone originating from the target position. Therefore, the entire front surface of the folding mirror 214 serves to collect the optical emission and to reflect it to-wards the concave spherical mirror 216. The at least one opening in the reflecting surface of the folding mirror 214 represents only a relatively small sub-area of the front side of the folding mirror 214, and hence only a negligible portion of the collected light is lost due to the at least one opening in the front surface of the folding mirror 214.

In an example, the at least one aperture comprises a first cylindrical bore that has its axis aligned with the main axis of the propagation path of the excitation and a second cylindrical bore that has its axis aligned with the principal axis of the concave spherical mirror 216. As an example, the axis of the first cylindrical bore may be coaxial with the main axis of the propagation path of the excitation and/or the axis of the second cylindrical bore may be coaxial with the principal axis of the concave spherical mirror 216. In the exemplifying arrangement 200 (as depicted in FIGS. 2A and 28) the respective axes of the first and second cylindrical bores are perpendicular to each other and in or approximately in 45 degree angle with respect to the reflecting surface of the folding mirror 214. In other examples the angle between the respective axes of the first and second cylindrical bores may be different from 90 degrees and the axes may have a respective angles different from 45 degrees with respect to the reflecting surface of the folding mirror 214. The respective axes of the first and second cylindrical bores may intersect at the surface of the first side of the folding mirror 214, thereby providing a single elliptical opening in the reflecting surface on the front side of the folding mirror 214 and two (possibly) partially overlapping elliptical openings on the back side of the folding mirror 214. The diameter of the first bore needs to be sufficient to enable the excitation pass through the folding mirror 214, whereas the diameter of the second bore needs to be sufficient to enable the optical emission reflected from the concave spherical mirror 216 to pass through the folding mirror 214 unaffected.

In another example, the at least one aperture comprises a conical bore having a cross-section that increases from the front side of the folding mirror 214 towards the back side of the folding mirror 214. Consequently, the conical bore involves a first (smaller) circular opening in the reflecting surface on the front side of the folding mirror 214 and a second (larger) circular opening on the back side of the folding mirror 214. The respective diameters of the first and second openings (that define the overall shape of the conical bore) need to be sufficient to enable the excitation pass through the folding mirror 214 and to enable the optical emission reflected from the concave spherical mirror 216 to pass through the folding mirror 214 unaffected.

The arrangement of two cylindrical bores or a conical bore to provide the at least one aperture in the folding mirror 214 enable simple provision of the at least one aperture e.g. by drilling. However, the arrangement of two cylindrical bores and the conical bore serve as non-limiting examples of providing the at least one aperture in the folding mirror 214. In further examples, the at least one aperture may be provided as one or more bores of an arbitrary shape. Instead of or in addition to drilling, techniques such as laser cutting and/or etching may be applied in providing the at least one aperture of in the folding mirror 214.

The distance between the image point of the concave spherical mirror 216 and (the back side of) the folding mirror 214 is preferably as small as possible: the optical emission reflected from the concave spherical mirror 216 has a conical overall shape that converges towards the optical receiver at the image point of the concave spherical mirror 216, and hence having the image point (and hence the optical receiver) as close as possible to the back side of the folding mirror 214 enables keeping the at least one opening on the front side of the folding mirror 214 small—which in turn facilitates minimizing disturbance to the optical emission reflected from the folding mirror 214 towards the concave spherical mirror 216. Moreover, arranging the optical receiver as close as possible to the back side of the folding mirror 214 facilitates providing the detector assembly 200 in small size, which is especially advantageous when the detector assembly 200 is employed in a handheld analyzer device.

A further advantage of the detector assembly 200 is that the light collection arrangement 104 that transfers the optical emission from the target position to the optical receiver at the image point of the concave spherical mirror 216 (e.g. the spectrometer 106 or the first end of the optical fiber 218) using a small number of optical components, thereby enabling small size and relatively simple structure for the light collection arrangement 104 while also reducing the number of optical distortions that typically occur in real-life optical components.

Figure 3:
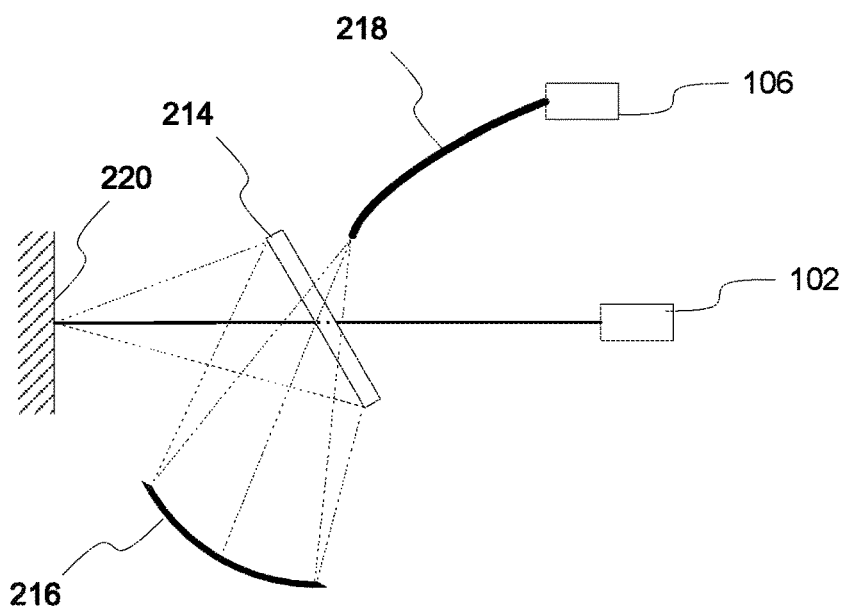
FIG. 3 schematically depicts some components of a detector assembly according to an example.

FIG. 3 schematically depicts an exemplifying variation of the detector assembly 200 schematically depicted in FIG. 2B. Similar modification is applicable to the detector assembly 200 schematically depicted in FIG. 2A or to other variations thereof. In the example schematically illustrated in FIG. 3, the relative position of the concave spherical mirror 216 with respect to the folding mirror 214 is different from that applied in the examples of FIGS. 2A and 2B: the principal axis of the concave spherical mirror 216 meets the reflecting surface of the folding mirror 214 in or approximately in 30 degree angle of incidence. In other words, the arrangement of the concave spherical mirror 216 and the folding mirror 214 according to the example of FIG. 3 results in approximately 60 degree angle between the principal axis of the concave spherical mirror 216 and the center axis of the optical emission between the target position and the folding mirror 214.

In consideration of providing the at least one aperture in the folding mirror 214 as one that comprises the first and second cylindrical bores along the lines described in the foregoing with references to FIGS. 2A and 2B, in a scenario according to FIG. 3 the first and second cylindrical bores may be provided such that their center axes intersect at the surface of the first side of the folding mirror 214 in an approximately 60 degree angle. Considering the other example of providing the at least one aperture in the folding mirror 214 as conical bore, the description provided in the foregoing with references to FIGS. 2A and 2B applies to a scenario according to FIG. 3 as well.

In further variations of the detector assembly 200, the angle between the principal axis of the concave spherical mirror 216 and the reflecting surface of the folding mirror 214 may be different from the non-limiting examples of 45 and 60 degrees described in the foregoing, e.g. 30 degrees. In general, any suitable angle in the range from 20 to 70 degrees may be applied, where the most suitable design depends on the shape and size of the front end of the casing of the analyzer device 100 within which the detector assembly 200 is arranged.

Figure 4:
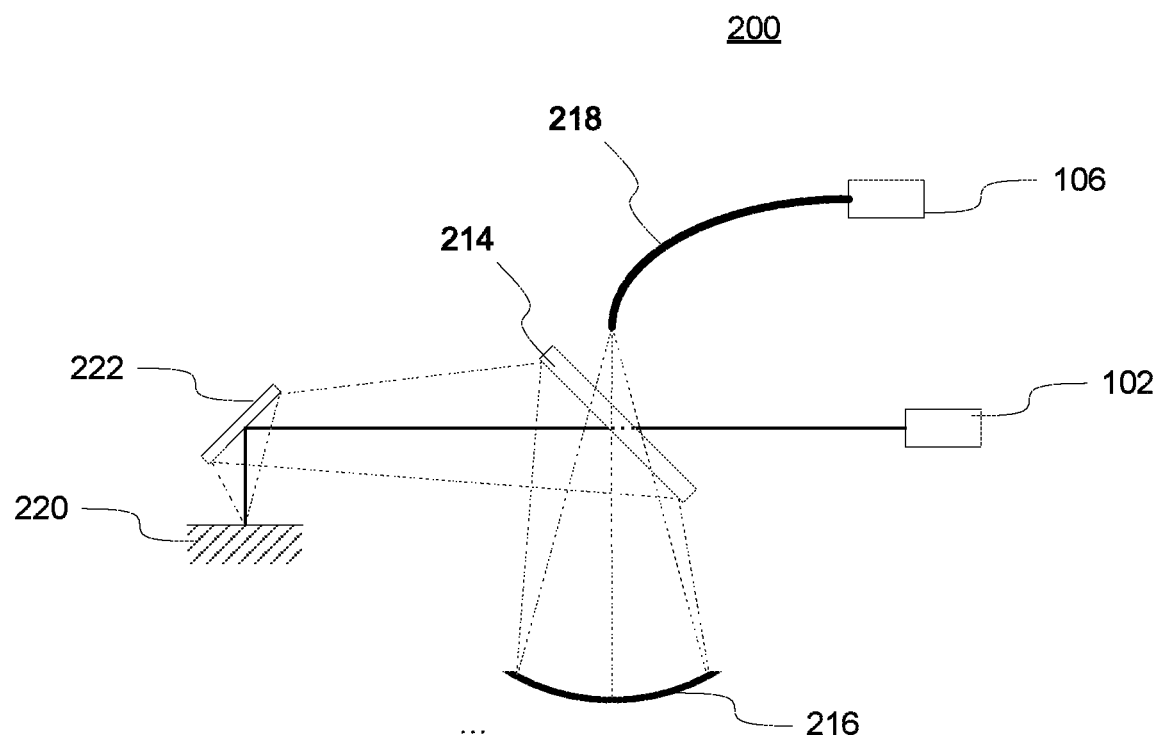
FIG. 4 schematically depicts some components of a detector assembly according to an example.

FIG. 4 schematically depicts an exemplifying variation of the detector assembly 200 schematically depicted in FIG. 2B. Similar modification is applicable to the detector assemblies 200 schematically depicted in any of FIGS. 2A and 3 or to other variations thereof. In the example schematically illustrated in FIG. 4, the light collection arrangement 104 further comprises a scanning mirror 222 arranged in an oblique angle with respect to the propagation path of the main axis of the excitation from the exciter 102 such that it creates a reflected target position that is off the main axis of the propagation path of the excitation, thereby invoking the optical emission at the reflected target position. The scanning mirror 222 also serves to further fold the principal axis of the concave spherical mirror 216 towards the reflected target position to enable reception of the optical emission therefrom. The scanning mirror 222 is positioned such that the folding mirror 214 resides between the exciter 102 and the scanning mirror 222. The optical emission invoked in the reflected target position due to the excitation from the exciter 102 is reflected via the scanning mirror 222, via the folding mirror 214, via the concave spherical mirror 216 and through the at least one aperture in the folding mirror 214 to the first end of the optical fiber 218 (or, in a general case, to the optical receiver) at the image point of the concave spherical mirror 216, thereby effectively transferring the optical emission from the reflected target position to the spectrometer 106.

The scanning mirror 222 may be moveable with respect to the exciter 102 and the other components of the light collection arrangement 104 such that the distance and/or orientation of the scanning mirror 222 with respect to the folding mirror 214 and the exciter 102 is changed. The movement of the scanning mirror 222 may be provided via an actuator that operates under control of the control entity 112. In an example, the scanning mirror 222 is moveable such that the reflected target point is moved according to a predefined pattern, wherein the predefined pattern may comprise e.g. a line, a curve, or an area on the surface of the sample 220. Hence, the movement of the scanning mirror 222 results in scanning a plurality of positions on the surface of the sample 220, which enables compensating for possible micro-scale variations in elemental composition on the surface of the sample 220.

FIG. 5 depicts a flowchart 300 that illustrates a method for facilitating analysis of elemental composition of the sample 220 using optical emission spectroscopy. The method according to the flowchart 300 may be provided using an arrangement comprising the folding mirror 214 and the concave spherical mirror 216, arranged e.g. as the light collection arrangement 104 described in the foregoing via a number of examples. The method according to the flowchart 300 comprises generating an excitation focused at the target position to invoke an optical emission from a surface of the sample 220 arranged at the target position, wherein the excitation is transferred towards the target position through the at least one aperture in the folding mirror 214, as indicated in block 302. The excitation may comprise, for example, one or more laser pulses emitted from a laser source.

The method further comprises transferring the optical emission from the target position via the folding mirror 214, via the concave spherical mirror 216 and through the at least one aperture in the folding mirror 214 to the optical receiver arranged at the image point in the principal axis of the concave spherical mirror 216, wherein the folding mirror 214 folds the principal axis of the concave spherical mirror 216 towards the target position, as indicated in block 304. The optical receiver may comprise, for example, the spectrometer 106 or the first end of the optical fiber 218 that has the spectrometer 106 arranged at its second end. For the latter example in this regard, the method may further comprise transferring the optical emission from the first end of the optical fiber 218 arranged at the image point of the concave spherical mirror 216 to the spectrometer 106 arranged at the second end of the optical fiber 218, as indicated in block 306.

The above-described method maybe varied and/or complemented in a number of ways, for example as described in the foregoing via a number of examples pertaining to the light collection arrangement 104 and/or the detector assembly 200.

In the foregoing, various examples pertaining to the structure and operation of the analyzer device 100 and the detector assembly 200 are described with references to usage of a laser source as the exciter 102, thereby substantially describing respective aspects of a LIBS device. In other examples, the analyzer device 100 may not necessarily be provided as a LIBS device and/or the exciter 102 may not necessarily involve a laser source but may apply a light source of different kind instead. As a non-limiting example in this regard, the analyzer device 100 and the detector assembly 200 described throughout the present disclosure may be applied for providing a near-infrared (NIR) spectroscopy device, where the exciter 102 may comprise e.g. a laser source, one or more light emitting diodes (LEDs) or one or more halogen light bulbs.

Figure 6:
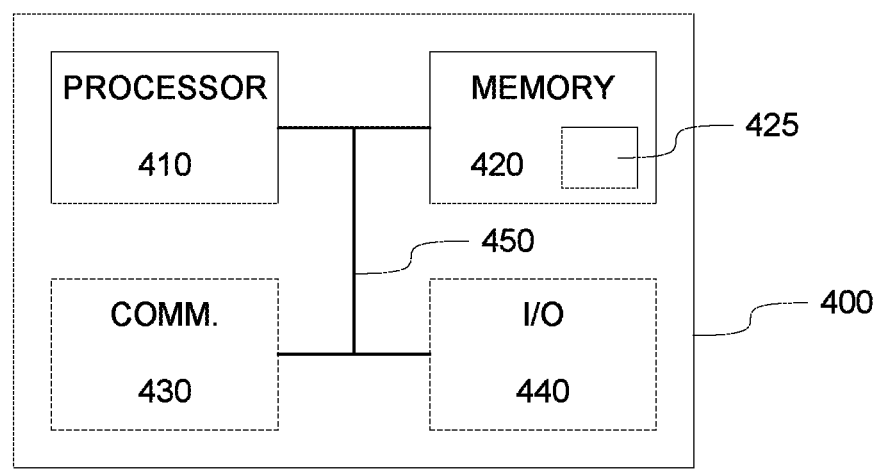
FIG. 6 depicts a block diagram of some elements of an apparatus according to an example.

Referring back to the example of FIG. 1, each of the analyzer 110 and the control entity 112 may be provided by a respective hardware means, by a respective software means or by a respective combination of a hardware means and a software means. As an example in this regard, FIG. 6 schematically depicts some components of an apparatus 400 that may be employed to implement one or more of the analyzer 110 and the control entity 112. The apparatus 400 comprises a processor 410 and a memory 420. The memory 420 may store data and computer program code 425. The apparatus 400 may further comprise communication means 430 for wired or wireless communication with other apparatuses and/or user I/O (input/output) components 440 that may be arranged, together with the processor 410 and a portion of the computer program code 425, to provide the user interface for receiving input from a user of the analyzer device 100, and/or providing output to the user of the analyzer device 100. In particular, the user I/O components may include user input means, such as one or more keys or buttons, a keyboard, a touchscreen or a touchpad, etc. The user I/O components may include output means, such as a display or a touchscreen. The components of the apparatus 400 are communicatively coupled to each other via a bus 450 that enables transfer of data and control information between the components.

The memory 420 and a portion of the computer program code 425 stored therein may be further arranged, with the processor 410, to provide the analyzer 110 and/or the control entity 112. The processor 410 is configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement functions of the analyzer 110 and/or the control entity 112 when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus 400 to operate as the analyzer 110 and/or the control entity 112 e.g. according to operations, procedures and/or functions described in the foregoing. Hence, the apparatus 400 may comprise at least one processor 410 and at least one memory 420 including the computer program code 425 for one or more programs, the at least one memory 420 and the computer program code 425 configured to, with the at least one processor 410, cause the apparatus 400 to operate as the analyzer 110 and/or the control entity 112 e.g. in accordance with operations, procedures and/or functions described in the foregoing.

The computer program code 425 may be provided e.g. a computer program product comprising at least one computer-readable non-transitory medium having the computer program code 425 stored thereon, which computer program code 425, when executed by the processor 410 causes the apparatus 400 to operate as the analyzer 110 and/or the control entity 112 e.g. according to operations, procedures and/or functions described in the foregoing. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A detector assembly for an analyzer device for analysis of elemental composition of a sample using optical emission spectroscopy, the detector assembly comprising
    an exciter for generating an excitation focused at a target position to invoke an optical emission from a surface of the sample at the target position; and
    a light collection arrangement for transferring the optical emission to a spectrometer, the light collection arrangement comprising a concave spherical mirror, an optical receiver arranged in an image point in the principal axis of the concave spherical mirror and a folding mirror including at least one aperture,
    wherein the exciter is arranged with respect to the light collection arrangement such that the excitation is transferred towards the target position through said at least one aperture, and
    wherein the folding mirror is arranged between the concave spherical mirror and the optical receiver such that the folding mirror folds the principal axis of the concave spherical mirror towards the target position and such that said at least one aperture is aligned with the principal axis of the concave spherical mirror to allow transferring optical emission reflected from the concave spherical mirror therethrough towards the optical receiver.

2. The detector assembly according to claim 1, wherein the optical receiver comprises a first end of an optical fiber arranged at said image point of the concave spherical mirror for transferring the optical emission therethrough to a spectrometer arranged at a second end of the optical fiber.

3. The detector assembly according to claim 1, wherein the optical receiver comprises a spectrometer arranged in said image point of the concave spherical mirror.

4. The detector assembly according to claim 1, wherein the exciter is positioned with respect to the folding mirror and the concave spherical mirror such that the main axis of the propagation path of the excitation is coaxial with the folded portion of the principal axis of the concave spherical mirror.

5. The detector assembly according to claim 1, wherein a reflecting surface of the folding mirror is arranged in an oblique angle with respect to the principal axis of the concave spherical mirror.

6. The detector assembly according to claim 1, wherein the at least one aperture comprises
a first cylindrical bore that has its axis aligned with the main axis of the propagation path of the excitation; and
a second cylindrical bore that has its axis aligned with the principal axis of the concave spherical mirror.

7. The detector assembly according to claim 6, wherein the respective axes of the first and second cylindrical bores intersect at a reflecting surface of the folding mirror.

8. The detector assembly according to claim 6,
wherein the principal axis of the concave spherical mirror is arranged to meet a reflecting surface of the folding mirror in approximately 45 degree angle, and
wherein the respective axes of the first and second cylindrical bores are perpendicular to each other and meet the reflecting surface of the folding mirror in approximately 45 degree angle.

9. The detector assembly according to claim 1, wherein the at least one aperture comprises a conical bore having a cross-section that increases from a reflecting surface of the folding mirror towards the back side of the folding mirror.

10. The detector assembly according to claim 1, wherein the light collection arrangement comprises a scanning mirror arranged in an oblique angle in the propagation path of the excitation from the exciter such that the scanning mirror creates a reflected target position that is off the main axis of the propagation path of the excitation, wherein the scanning mirror is moveable with respect to the exciter and with respect to the folding mirror.

11. The detector assembly according to claim 1, wherein the exciter comprises a laser source for generating the excitation that comprises one or more laser pulses.

12. The detector assembly according to claim 1, wherein the image point is positioned in the principal axis of the concave spherical mirror at a predefined distance from the concave spherical mirror.

13. An analyzer device for analysis of elemental composition of a sample, the analyzer device comprising:
a detector assembly according to claim 1; and
a casing for enclosing components of the detector assembly,
wherein the detector assembly is arranged in a front end of the casing such that when the front end of the analyzer device is placed close to or against a surface of the sample, the target position is at or approximately at the surface of the sample.

14. A method for facilitating analysis of elemental composition of a sample using optical emission spectroscopy by using a light collection arrangement comprising a folding mirror including at least one aperture and a concave spherical mirror, the method comprising:
generating an excitation focused at a target position to invoke an optical emission from a surface of the sample at the target position, wherein the excitation is transferred towards the target position through said at least one aperture in the folding mirror; and
transferring the optical emission from the target position via the folding mirror, via the concave spherical mirror and through said at least one aperture in the folding mirror to an optical receiver arranged at an image point in the principal axis of the concave spherical mirror, wherein the folding mirror folds the principal axis of the concave spherical mirror towards the target position.

15. The method according to claim 14, further comprising transferring the optical emission from a first end of an optical fiber arranged at said image point of the concave spherical mirror to a spectrometer arranged at a second end of the optical fiber.

* * * * *